United States Patent
Fischerkeller et al.

(10) Patent No.: US 6,269,800 B1
(45) Date of Patent: Aug. 7, 2001

(54) DEVICE FOR FEEDING FUEL

(75) Inventors: Rolf Fischerkeller, Walheim; Uwe Liskow, Pleidelsheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/098,092

(22) Filed: Jun. 16, 1998

(30) Foreign Application Priority Data

Aug. 20, 1997 (DE) ............................................. 197 36 088

(51) Int. Cl.$^7$ .................................................. F02M 37/04
(52) U.S. Cl. ..................... 123/514; 417/198; 137/527.8
(58) Field of Search .................................. 123/509, 514; 417/198, 182, 79–80; 137/527.6, 527.8; 251/118

(56) References Cited

U.S. PATENT DOCUMENTS

| | | | | |
|---|---|---|---|---|
| 4,340,023 | * | 7/1982 | Creager | 123/514 |
| 4,397,333 | * | 8/1983 | Liba et al. | 123/514 |
| 4,503,885 | * | 3/1985 | Hall | 123/514 |
| 4,750,522 | * | 6/1988 | Griffin et al. | 123/514 |
| 5,341,840 | * | 8/1994 | Manson et al. | 137/527.8 |
| 5,622,205 | * | 4/1997 | Petersen | 137/527.8 |
| 5,667,366 | * | 9/1997 | Reef et al. | 417/198 |
| 5,791,317 | * | 8/1998 | Eck | 123/514 |

FOREIGN PATENT DOCUMENTS

| | | |
|---|---|---|
| 42 24 981 A1 | 2/1994 | (DE) . |
| 44 26 667 A1 | 2/1996 | (DE) . |

\* cited by examiner

*Primary Examiner*—Thomas N. Moulis
(74) *Attorney, Agent, or Firm*—Michael J. Striker

(57) ABSTRACT

A device for feeding fuel from a supply container to an internal combustion engine of a motor vehicle has a supply container, a collecting cup arranged in the supply container, a fuel feeding pump which aspirates fuel from the collecting cup, a feeding conduit into which the aspirated fuel is fed to the internal combustion engine, a return conduit through which a fuel is returned back to said supply container, a jet pump arranged in the supply container and having a jet nozzle connected with the return conduit, a mixing pipe which is open in the collecting cup and is substantially in alignment with the jet nozzle, a suction opening provided between the jet nozzle and the mixing pipe, a check valve flap arranged in the collecting cup and closing an outlet of the mixing pipe, the check valve flap being formed so that it deviates a filling jet of the jet pump which is supplied from fuel from the supply container into the suction cup against a fuel pressure in the suction cup, from the outlet of the mixing pipe.

13 Claims, 3 Drawing Sheets

DEVICE FOR FEEDING FUEL

BACKGROUND OF THE INVENTION

The present invention relates to a device for feeding fuel from a supply container to an internal combustion engine of a motor vehicle.

Devices of the above mentioned general type are known in the art. One of such devices is disclosed for example in the German patent document DE 42 24 981 A1. In this device the fuel which is returned to the supply container is branched from the feeding conduit in the flow direction of the fuel before a check valve and supplied through the return conduit of the check pump which extends near the cup bottom through the cup wall of the accumulating cup. In another fuel feeding device of this type disclosed in the German patent document DE 44 26 667 A1 the return conduit leads the fuel which is not used by the internal combustion engine, back into the supply container and supplies there the jet nozzle of the jet pump. The mixing pipe of the jet pump is formed of one piece with the cup wall of the collecting cup and located near the cup bottom, while the outlet opening of the mixing pipe is flush with the inner side of the cup wall.

SUMMARY OF THE INVENTION

Accordingly, it is an object of the present invention to provide a device for feeding fuel which has the advantage that the check valve flap, with the jet pump turned off, abuts against the output of the mixing pipe under the action of the fluid pressure produced by the fuel volume in the collecting cup and closes the mixing pipe outlet hermetically.

It is thereby guaranteed that the accumulating cup in condition with the internal combustion engine is stopped, remains filled, and the feeding pump during the start of the internal combustion engine, in which the jet pump can not feed the fuel because of failing fuel return flow, provides optimal suction conditions in the collecting cup also at the low filling level of the supply container. With the repeated operation of the jet pump, the check valve flap is turned away from the outlet of the mixing pipe by the fuel filling jet of the jet pump which is composed of the fuel exiting the jet nozzle and entrained from the supply container by the jet suction action, and as a result the check valve flap is retained in the turned off condition. When the internal combustion is stopped and the jet pump is set in operation, the check valve flap can again be placed on the output of the mixing pipe and close the collecting cup.

The inventive device for feeding of fuel is therefore designed so that the check valve flap which closes the output of the mixing pipe is arranged in the collecting cup and formed so that it is turnable by the fuel jet which is fed by the jet pump from the fuel from the supply container into the collecting cup against the fuel pressure in the accumulating cup, from the output of the mixing pipe.

In accordance with a preferable embodiment of the present invention, the inventive check valve flap can be formed in a simple manner by a closing member which overlaps the outlet of the mixing pipe and an angular lever which carries the closing member and is turnably supported in the collecting cup on a lever end remote from the closing member. The closing member is preferably formed as a shell shaped or bell shaped cap of the elastic material, which is placed with its cap end on the ring-shaped end side of the mixing pipe.

In accordance with a preferable embodiment of the present invention, means is provided in the jet pump, which prevent a direct striking of the fuel jet exiting from the jet nozzle with a high speed, against the check valve flap. With the low fuel level in the supply container, the suction opening of the jet pump during splashing of the fuel in the supply container because of the curved or inclined driving of the motor vehicle emerges predominantly from the fuel so that the fuel jet exiting the jet nozzle, here called the free jet, can not give away its energy in the region of the suction opening to the fuel volume before the mixing pipe and thereby no fuel is fed from the supply container. The energy-rich free jet acts however on the check valve flap and holds it open, so that with stepping the fuel feeding in the collecting cup the collecting cup is empted with the open check valve flap through the mixing pipe and thereby the fuel feeding to the internal combustion engine is interrupted. The inventive means hold the free jet from the check valve flap, so that when the suction pump emerges from the fuel it closes because of the failing force action and during splashes of the fuel the accumulating cup is filled.

In accordance with preferable embodiment of the invention, the above mentioned means specifically is formed has an impact body arranged centrally in the mixing pipe and having a diameter which is greater than the jet cross-section of the free jet. Therefore, the free jet is prevented from directly striking against the check valve flap, however not with a fuel filling jet of the jet pump emerging in the fuel volume, whose cross-section corresponds to the throughgoing cross-section of the mixing pipe and thereby flows over the impact body. With this fuel filling jet, as described, the return valve flap if lifted from the outlet of the mixing pipe, and the pumping of the fuel through the jet pump from the supply container into the collecting cup is performed without problems.

In accordance with an advantageous embodiment of the invention, the impact body is mounted on a holding web which extends diametrically through the mixing pipe. The holding web is formed of one piece with the mixing pipe or can form a yoke of a U-shaped holding bracket which is separately inserted in the mixing pipe.

In accordance with an alternative embodiment of the invention, an impact body can be formed as a semi-disk or semi-sphere with a convex surface facing the jet nozzle, as a cone with a cone tip facing the jet nozzle, or as a disk or a plate.

In accordance with an alternative embodiment of the invention the means for holding the free jet from the check valve flap is formed as at least one deviating body arranged in the jet nozzle. It deviates the free jet exiting the jet nozzle from the nozzle axis so that it is tangential to the inner wall of the mixing pipe.

In accordance with various embodiments of the invention, the deviating body can be inserted in a central nozzle opening of the jet nozzle, which produces a conically shaped expanding free jet, or several deviating bodies can be inserted in the central nozzle opening of the jet nozzle so that the free jet is subdivided into several partial jets which are located on a conical surface extending from the nozzle opening. In the later case preferably the deviating body is formed of one piece with the nozzle body of the jet nozzle, and inserted in the nozzle body from its end side from the openings extending at an acute angle to the nozzle axis and opening into the central nozzle opening.

In accordance with a preferable embodiment of the invention, in addition a tubular stop is provided in the mixing pipe near the mixing pipe outlet, which extends radially inwardly and is ring shaped. Also, the arrangement of the mixing pipe and the jet nozzle is selected so that the free jet and the individual partial jets of the free jets strike against the tubular stop. The energy of the free jet is reduced at the tubular stop and can not act on the check valve flap in the periphery reduced by the deviation of the mixing pipe inner rod.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
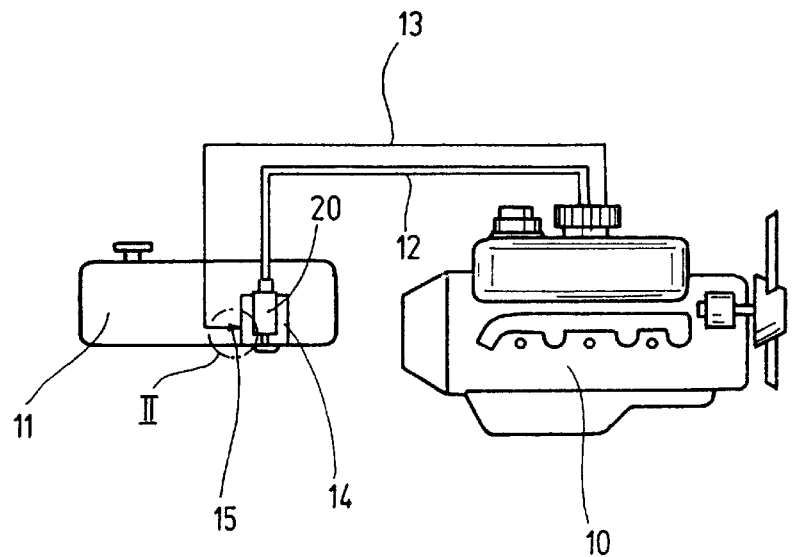
FIG. 1 is a view schematically showing a fuel feeding device in connection with a supply container for fuel and an internal combustion engine which is supplied with fuel from the supply container.

FIG. 1 shows in principle a simplified view of an internal combustion engine of a motor vehicle, which is supplied with fuel from a supply container 11 by a device for feeding the fuel. The supply of the fuel is performed through a feeding conduit 12 which leads from the supply container 11 to the internal combustion engine 10. Fuel which is not used flows from the internal combustion engine through a return conduit 13 back into the supply container 11.

A collecting cup 14 is arranged in the supply container 11. Fuel is aspirated from the collecting cup 14 by a fuel feeding pump 20 and supplied into the feeding conduit 12. Further, a jet pump 15 is arranged in the supply container 11 and connected to the return conduit 13. During the operation of the internal combustion engine 10 its supplies fuel from the supply container 11 into the collecting cup 14, so that it is always sufficiently filled, in particular when the fuel level in the supply container 10 is lowered to a minimum. The jet pump 15 is driven by the fuel which flows back through the return conduit 13, as known in the art.

Figure 2:
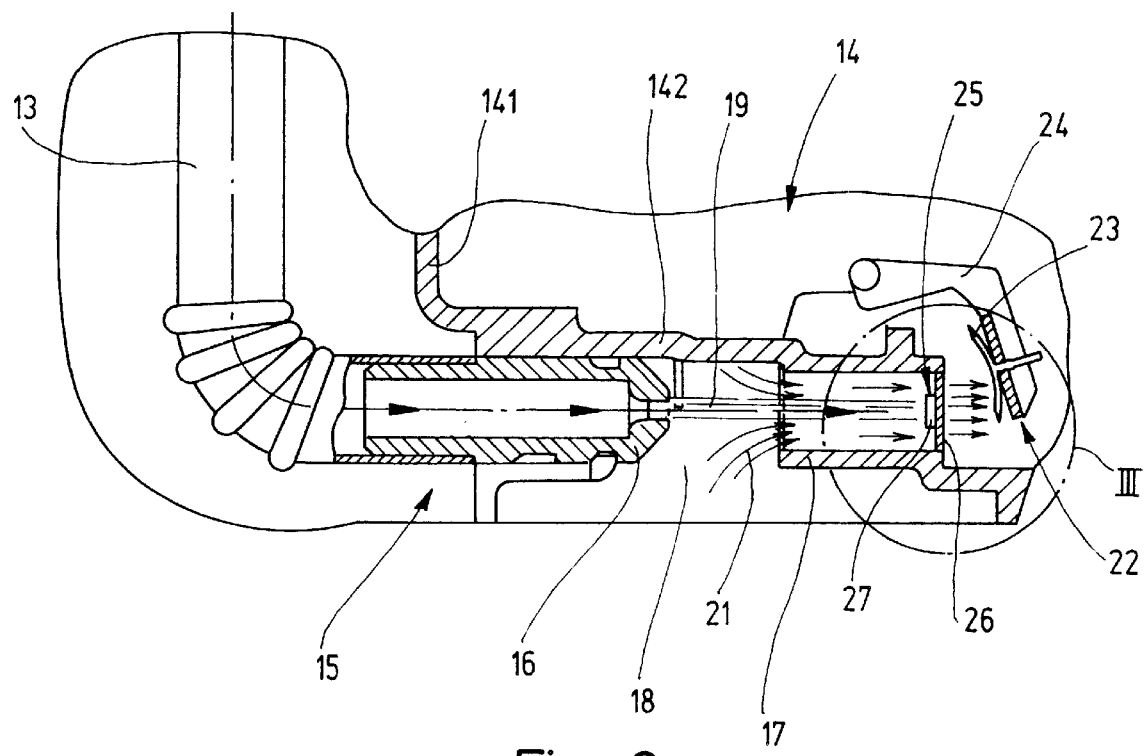
FIG. 2 is an enlarged view of a section II taken in FIG. 1.

The jet pump 15 is shown in FIG. 2 in a longitudinal section on an enlarged scale. It has a jet nozzle 16, a mixing pipe 17 which is in alignment with the jet nozzle, and a suction opening 18 located between the jet nozzle 16 and the mixing pipe 17. The jet nozzle 16 is closed at the inlet side at the end of the return conduit 13, and the mixing pipe 17 is inserted in the collecting cup 14 near its cup bottom 142, so that the mixing pipe 17 provides a connection between the interior of the supply container 11 and the interior of the collecting cup 14.

In the embodiment of FIG. 2, the mixing cup 17 is formed of one piece with the cup bottom 142 which is stepped. The outlet opening 171 of the mixing pipe 17 is flush with the inner surface of the cup bottom step. The mixing pipe 17 can be inserted as a separate component into an opening in the cup wall 141 and mounted in it. The jet nozzle 16 which is arranged at a distance from the mixing pipe 17 in alignment with it, is mounted on the lower side of the cup bottom 142. The suction opening of the jet pump 15 is formed by the free space remaining between the jet nozzle 16 and the mixing pipe 17 under the cup bottom 142.

During the operation of the internal combustion engine 10, the fuel which flows back through the return conduit 13 exits as a jet with high speed from the jet nozzle 16. The fuel jet identified with reference numeral 19 in FIG. 2 and further mentioned as the free jet 19 receives in the region of the suction opening 18 its energy from the fuel in the supply container 11 and gives it in the mixing pipe 17, so as to feed the fuel from the supply container 11 through the mixing pipe 17 into the collecting cup 14. This fuel which is withdrawn from the supply container 11 together with the fuel exiting the jet nozzle 16 is supplied into the collecting cup 14 as identified with arrows 21 in FIG. 2. During the operation of the internal combustion engine, the constantly operating jet pump 15 guarantees, that independently from fuel level in the supply container 11 the collecting cup 14 is always completely filled with fuel and thereby the fuel supply of the internal combustion engine 10 operates without distortion up to a minimal filling level.

Figure 7:
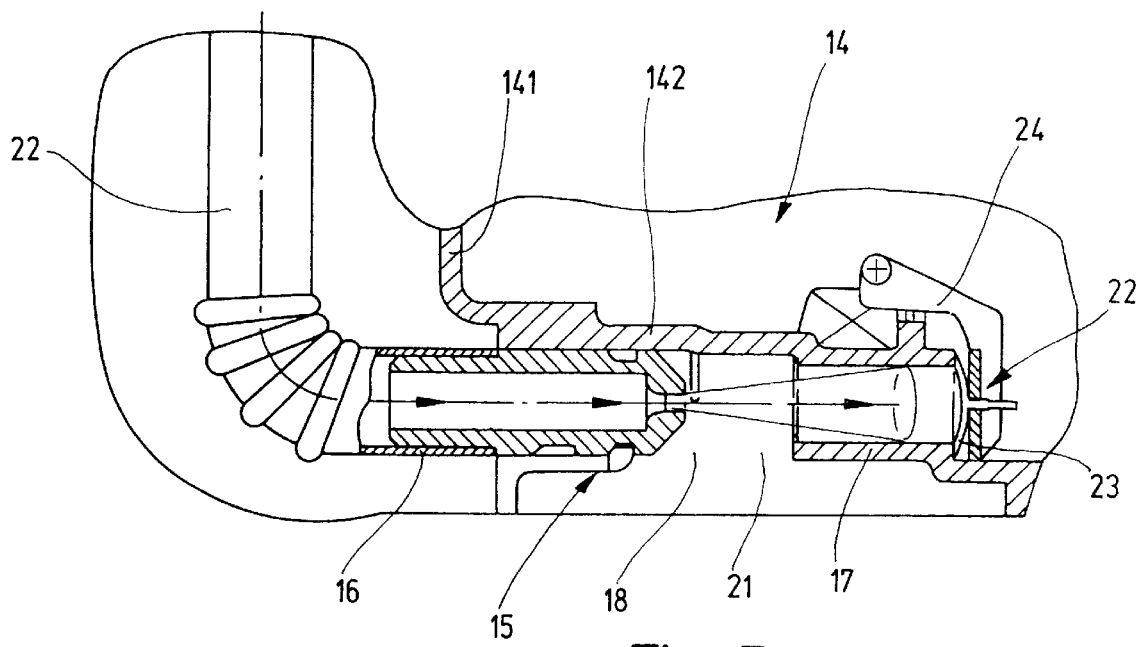
FIG. 7 is a view substantially corresponding to the view of FIG. 2 but showing a modified jet pump and a closed check valve flap.

A check valve flap 22 is arranged in the collecting cup 14. It has a closing member 23 which overlaps the outlet opening 171 of the mixing pipe 17 and an angle lever 24 which carries the closing member 23 and is turnably supported on the cup bottom 142 of the collecting cup 14 at the lever end which is removed from the closing member. The closing member 23 is formed preferably as a shell or bell-shaped cap of an elastic material. It is placed with its cap end on the ring-shaped end side of the mixing pipe 17 and can seal the outlet opening 171. The check valve flap 22 is constructed so that when the jet pump 15 is not in operation it is pressed by the liquid pressure acting in the collecting cup 14 with its closing member 23 against the outlet side of the mixing pipe 17 as shown in FIG. 7. When the jet pump 15 is in operation, the fuel jet acting on the closing member 23 turns the angle lever 24 away, so that the closing member 23 releases the outlet opening 171 of the mixing pipe 17 as shown in FIG. 2. As long as the jet pump 15 is in operation, the pressure applied by the filling jet of the jet pump 16 on the check valve flap 22 holds the check valve flap 22 against the liquid pressure in the collecting cup 14 in its turned away position.

With the low fuel level in the supply container 11 and simultaneous splashing of the fuel because of the curved or inclined travel of the vehicle, the jet pump 15 can emerge from the fuel volume. The free jet exiting the jet nozzle 16 can no longer give its energy to a fuel volume and therefore no fuel is pumped from the supply container 11 to the collecting cup 14. The energy-rich free jet 19 holds the check valve flap 22 by its striking force in the center, so that the fuel flows back from the collecting cup 14 into the supply container 11, and the internal combustion engine after a short time is no longer sufficiently supplied with fuel. In order to avoid this possible empty running of the collecting cup 14, means is provided in the jet pump 15 which prevents a direct striking of the free jet 19 exiting the injection nozzle 16 against the check valve flap 22. Therefore it is guaranteed that when there is no fuel in the suction region of the jet pump 15 the free jet which exits the jet nozzle 19 with high speed does not open the check valve flap 22 and does not hold it open.

Figure 3:
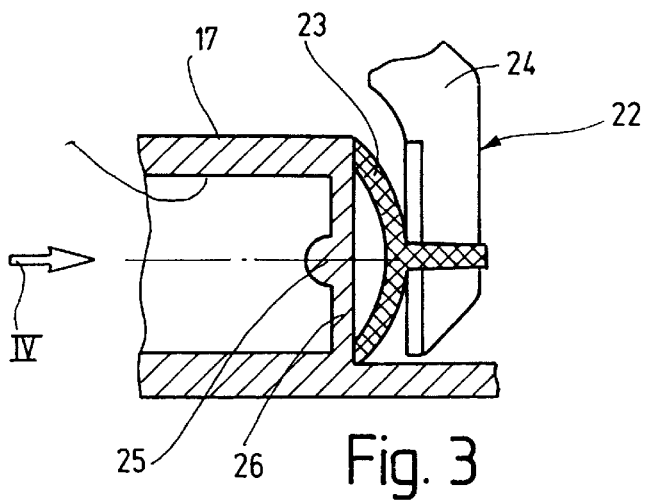
FIG. 3 is an enlarged view of the section III of the check valve flap shown in FIG. 2.
Figure 4:
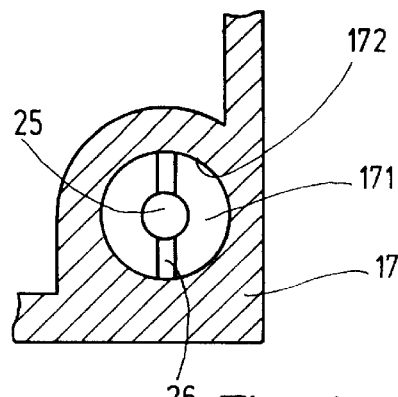
FIG. 4 is a view as seen in direction of the arrow IV in FIG. 3.

In the embodiment of FIG. 2 this means has an impact body 25 which is arranged centrally in the mixing pipe 17. Its diameter is greater than the jet cross-section of the free jet 19. The impact body 25 is mounted on a holding web 26 which extends diametrically of the mixing pipe 17 and is fixed on the inner wall of the mixing pipe. In both embodiments of FIG. 2 on the one hand and FIGS. 3 and 4 on the other hand, the holding web 26 is formed of one piece with the mixing pipe 17, and the impact body 25 is formed centrally of one piece with the holding web 26. The impact body 25 is formed of FIG. 2 as a disk 27 or a plate, and in FIGS. 3 and 4 is formed as a semi-sphere with a convex surface facing the injection nozzle 16.

Figure 5:
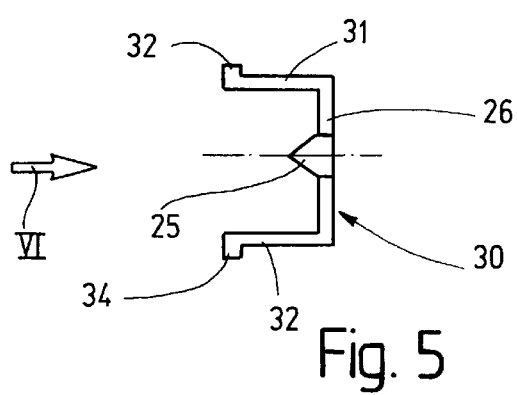
FIG. 5 is a side view of an impact insert for a mixing pipe of the jet pump of FIG. 2.
Figure 6:
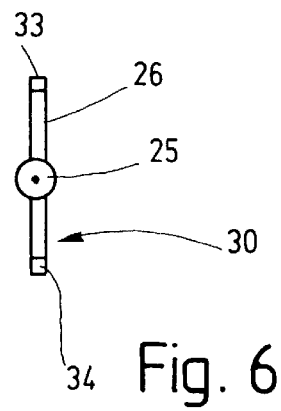
FIG. 6 is a view as seen in direction of the arrow VI in FIG. 5.

In the embodiment of FIGS. 5 and 6, the holding web 26 is formed by a yoke of a U-shaped holding bracket 30. Its both legs 31 and 32 which are connected with one another by the holding web 26 abut against the inner wall 172 of the mixing pipe 17. Each bracket leg 31, 32 carries at its free end a radially outwardly extending projection 33 or 34. After insertion of the holding bracket 30 in the mixing pipe 17 the projections extend radially through the end side of the mixing pipe 17 which faces the jet nozzle 16. The impact body 25 is formed as a cone which is designed of one piece with the holding bracket 30. It has a cone tip arranged centrally on the holding web 26 and facing toward the jet nozzle 16.

Figure 8:
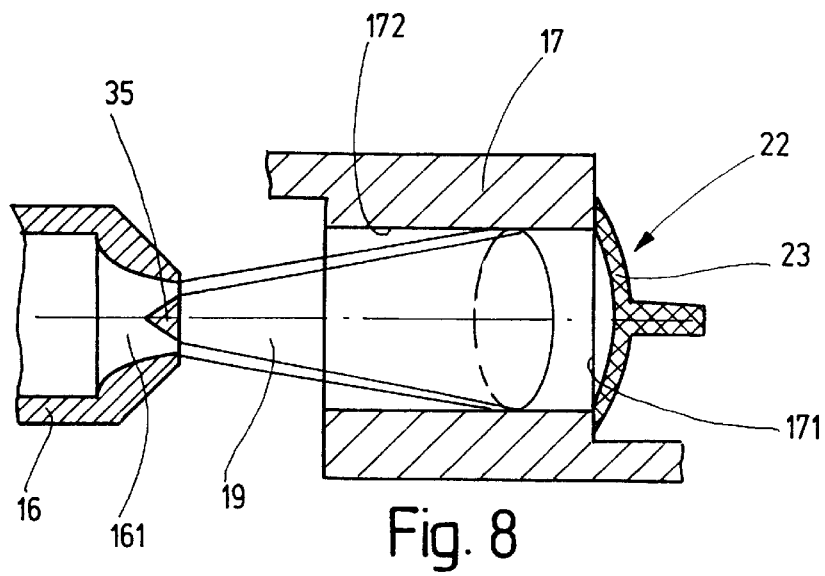
FIG. 8 is an enlarged view of a section of the jet pump in FIG. 7.
Figure 9:
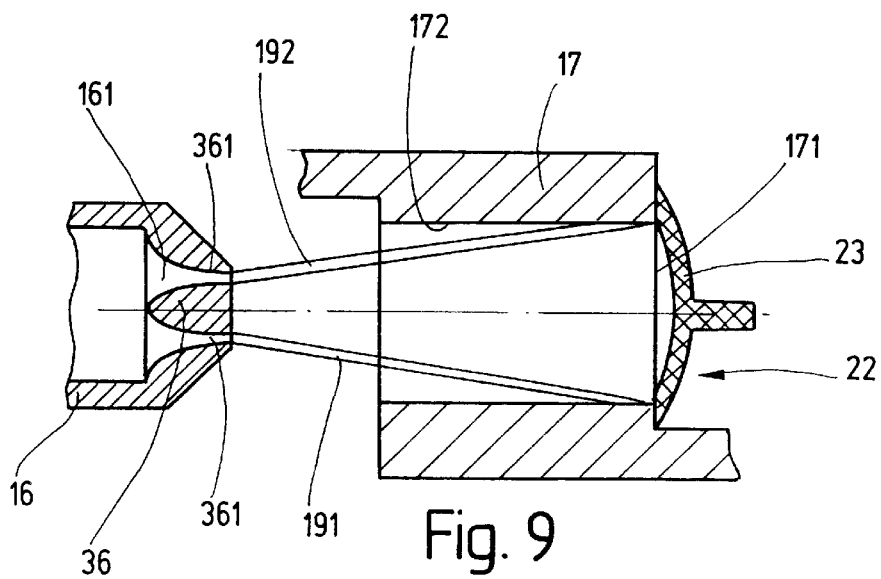
FIGS. 9 and 10 are views corresponding to the view of FIG. 8 but showing two further embodiments.
Figure 10:
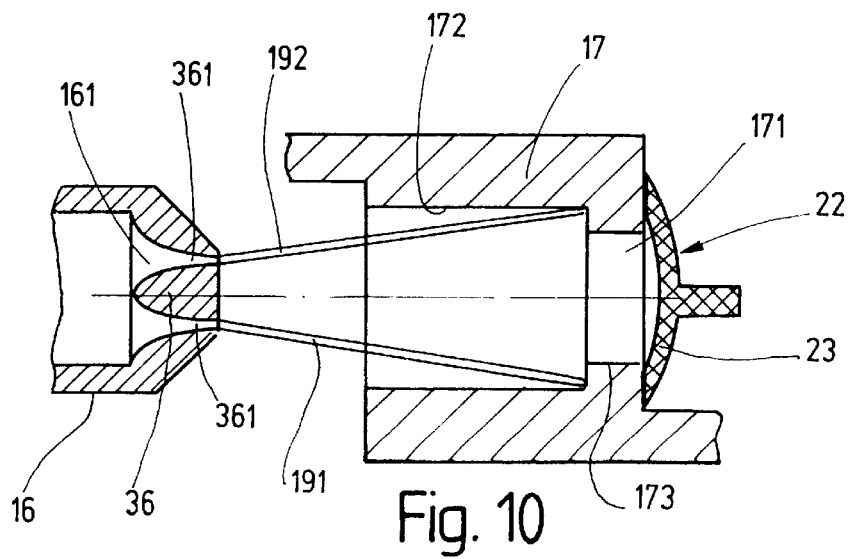

In the embodiment of the jet pump 16 shown in FIGS. 7 and 8 and in the embodiment of the jet pump 15 shown in FIGS. 9 and 10, a direct impact of the free jet 19 on the check valve flap 22 is prevented by a deviating body arranged in the central nozzle opening 161 of the jet nozzle 16. It deviates the free jet 19 exiting the jet nozzle 16 from the nozzle axis so that it strikes against the inner wall 172 of the mixing pipe 17 and there gives away its energy. In the embodiment of FIGS. 7 and 8, the deviating body 34 is formed so that the free jet 19 expands starting from the jet nozzle 16 in a cone-shaped manner, as schematically shown in FIG. 8.

In the embodiment of FIGS. 9 and 10 several deviating bodies 36 are inserted in the central nozzle opening 161 so that the free jet 19 is subdivided into several partial jets 191, 192. They are located on a conical surface extending from the nozzle opening 161, as schematically shown in FIGS. 9 and 10. Also, this individual partial jets 191, 192 act before the outlet opening 171 of the mixing pipe 17 on the inner wall 172 of the mixing pipe 17 and there give away its energy so that no forces can apply on the check valve flap 22. As for the manufacturing technique, these partial jets 191, 192 can be produced in a simple manner when the deviating body 36 is formed of one piece with the nozzle body of the jet nozzle, and from the end side of the jet nozzle 16 openings 361 are introduced so that they extend at an acute angle to the nozzle axis and open to the central nozzle opening 161. Preferably, the openings 361 are arranged on a partial circle at the same distances from one another.

In the embodiment of FIG. 10, additionally a radially inwardly projecting, ring-shaped tubular stop 173 is formed of one piece in the mixing pipe 17 near the outlet 171 of the mixing pipe. The arrangement of the mixing pipe 17 and the jet nozzle 16 is selected so that the partial jets 191, 192 extending on a conical surface from the jet nozzle 16 strike on the ring shaped end side of the tubular stop 173. This tubular stop 173 can be provided also in the embodiment of FIGS. 7 and 8 so that the free jet 19 which is conically expanded also strikes on the end side of the tubular step 173 and gives away here its energy.

It will be understood that each of the elements described above, or two or more together, may also find a useful application in other types of constructions differing from the types described above.

While the invention has been illustrated and described as embodied in device for feeding fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for feeding fuel from a supply container to an internal combustion engine of a motor vehicle, comprising a supply container; a collecting cup arranged in said supply container, a fuel feeding pump which aspirates fuel from the collecting cup; a feeding conduit into which the aspirated fuel is fed to the internal combustion engine; a return conduit through which a fuel is returned back to said supply container; a jet pump arranged in said supply container and having a jet nozzle connected with said return conduit; a mixing pipe which is open in said collecting cup and is substantially in alignment with said jet nozzle; a suction opening provided between said jet nozzle and said mixing pipe; a check valve flap arranged in said collecting cup and closing an outlet of said mixing pipe, said check valve flap being formed so that it deviates a filling jet of said jet pump which is supplied from fuel from the supply container into said suction cup against a fuel pressure in said suction cup, from said outlet of said mixing pipe, said jet pump being provided with means which prevent a direct striking of a free jet exiting said jet nozzle against said check valve flap.

2. A device as defined in claim 1, wherein said means has an impact body which is centrally arranged on said mixing pipe and has a diameter which is smaller than a jet cross-section of a free jet of fuel exiting a central nozzle opening of said jet nozzle.

3. A device as defined in claim 2, wherein said impact body is formed on a holding web which extends diametrically of said mixing pipe.

4. A device as defined in claim 3, wherein said holding web is formed of one piece with said mixing pipe.

5. A device as defined in claim 3, wherein said holding web is formed as a yoke of a U-shaped holding bracket which has legs abutting against an inner wall of said mixing pipe.

6. A device as defined in claim 5, wherein each of said legs of said holding brackets has a free leg end provided with a radially outwardly extending projection which radially engages an end side of said mixing pipe facing said jet nozzle.

7. A device as defined in claim 2, wherein said impact body is formed as a body selected from the group consisting of a semi-shell and a semi-sphere, said body having a convex outer surface facing said jet nozzle.

8. A device as defined in claim 2, wherein said impact body is formed as a cone with a cone tip facing said jet nozzle.

9. A device as defined in claim 2, wherein said impact body is formed as a body selected from the group consisting of a disk and a plate.

10. A device as defined in claim 1, wherein said means have at least one deviating body arranged in said jet nozzle and deviating the free jet exiting said jet nozzle from a nozzle axis so that it is tangential to an inner wall of said fixing pipe.

11. A device as defined in claim 10, wherein said deviating body is inserted in a central opening of said jet nozzle so as to form a free jet which expands in a conical manner.

12. A device as defined in claim 10, wherein said deviating body has a plurality of deviating members which are inserted in a central opening of said jet nozzle so as to subdivide the free jet of fuel into several fuel partial jets located on a conical surface exiting an opening of said jet nozzle.

13. A device as defined in claim 10, wherein said mixing pipe is provided with a radially inwardly expanding, ring-shaped stop located near said outlet of said mixing pipe, said mixing pipe and said jet nozzle being arranged relative to one another so that a free jet of fuel exiting said jet nozzle strikes against an end side of said tubular stop.

* * * * *